United States Patent [19]
Suzuki et al.

[11] Patent Number: 4,933,979
[45] Date of Patent: Jun. 12, 1990

[54] DATA READING APPARATUS FOR READING DATA FROM FORM SHEET

[75] Inventors: Akiko Suzuki, Kawasaki; Yoshikazu Sato, Sagamihara, both of Japan

[73] Assignee: Ricoh Company, Ltd., Tokyo, Japan

[21] Appl. No.: 133,623

[22] Filed: Dec. 16, 1987

[30] Foreign Application Priority Data

Dec. 19, 1986 [JP] Japan ............... 61-302898

[51] Int. Cl.$^5$ ............................................. G06K 9/00
[52] U.S. Cl. ....................... 382/61; 382/57; 382/65
[58] Field of Search ............ 382/61, 57, 65, 48; 358/280, 282, 462, 464

[56] References Cited

U.S. PATENT DOCUMENTS

| | | | |
|---|---|---|---|
| 3,820,067 | 1/1977 | Shepard | 382/61 |
| 4,566,127 | 1/1986 | Sekiya et al. | 382/61 |
| 4,677,551 | 6/1987 | Suganuma | 382/61 |
| 4,686,704 | 8/1987 | Kamada et al. | 382/61 |
| 4,691,238 | 9/1987 | Yamada | 358/280 |
| 4,811,416 | 3/1989 | Nakamura | 382/61 |

FOREIGN PATENT DOCUMENTS

| | | |
|---|---|---|
| 211674 | 6/1982 | Japan . |
| 211672 | 8/1982 | Japan . |
| 87652 | 4/1983 | Japan . |
| 136885 | 4/1985 | Japan . |
| 289476 | 6/1986 | Japan . |
| 39168 | 7/1986 | Japan . |

OTHER PUBLICATIONS

Yasuaki Nakano, Hiromichi Fujisawa, Osamu Kunisaki, Kunihiro Okada and Toshihiro Hananoi, "Understanding of Tabular Form Documents Cooperating with Character Recognition", The Transactions of the Institute of Electronics and Communication Engineers of Japan, vol. J69-D No. 3, Mar., 1986, pp. 400-409.

Primary Examiner—Leo H. Boudreau
Assistant Examiner—Yon Jung
Attorney, Agent, or Firm—Oblon, Spivak, McClelland, Maier & Neustadt

[57] ABSTRACT

A data reading apparatus for reading data from a form sheet comprises a scanning device for optically scanning the form sheet and for outputting image data read from the form sheet, a storing part for storing form informations on different kinds of model form sheets having different fixed forms, a discriminating part for discriminating the kind of the form sheet which is scanned by the scanning device by comparing a form information on the form sheet included in the image data from the scanning device with the form informations stored in the storing part, and a reading part for reading from the image data outputted from the scanning device data in predetermined reading areas of the form sheet depending on the form information of a model form sheet which is discriminated in the discriminating part as being identical to the kind of form sheet scanned by the scanning device.

15 Claims, 19 Drawing Sheets

FIG.22

1ST FORM SHEET

| FORM FILE NAME |
| NUMBER OF READING AREAS (n) |
| AREA NUMBER |
| KIND OF CHARACTER | IN CASE OF CHARACTER
| RECOGNIZED RESULT (CHARACTER CODE DATA) |
| AREA NUMBER |
| KIND OF CHARACTER | IN CASE OF IMAGE
| SIZE OF IMAGE DATA | IMAGE DATA (BIT MAP)
| WIDTH ALONG x-DIRECTION m(bytes) | WIDTH ALONG y-DIRECTION ℓ (lines) |

$\ell \times m$ bytes

2ND FORM SHEET

| FORM FILE NAME |
| NUMBER OF READING AREA |
| AREA NUMBER |
| KIND OF CHARACTER |

DATA READING APPARATUS FOR READING DATA FROM FORM SHEET

BACKGROUND OF THE INVENTION

The present invention generally relates to data reading apparatuses, and more particularly to a data reading apparatus for reading data from a form sheet and applicable to the so-called optical character reader (hereinafter simply referred to as OCR) which optically reads an image information.

In the present specification, the term "form sheet" is used to refer to a sheet which has a fixed form having spaces which are to be filled in or entered with data. The form sheet includes slips, tickets, debit notes, questionnaires, various kinds of sheets printed with a frame (fixed or standard form), headings and the like, and the data are entered into predetermined spaces in the form sheet identified by a line, a box and the like.

Various OCRs have been developed. The OCR scans a document by use of an image scanner, and reads an image information from the document as image data. The image information may include printed or handwritten characters on a sheet of paper. The characters are recognized from the image data, and the image data corresponding to the recognized characters are converted into character code data.

Compared to the case where an entry of data is made from a keyboard, the efficiency with which the data are entered is improved when the OCR is used as input means for entering character information and the like to processing systems which process character information and the like or to communication systems such as data communication systems which transmit character data. Such processing systems include word processing systems, automatic translating systems, systems for totalling form sheets and systems for producing data files for searches.

The OCR is provided with a dictionary for recognizing characters, and image data of character fonts are pre-registered in the dictionary as reference image information. A character recognition means compares image data of an entered character with image data in the dictionary and finds a pattern which matches that of the entered character. When a matching pattern is found, the character recognition means recognizes the entered character as a predetermined character and generates character code data corresponding to the predetermined character.

Generally, many kinds of character fonts, that is, many kinds of character designs such as types are used. For this reason, the dictionary for recognizing characters must be provided for each of the kinds of character designs.

However, when reading the writing in the document on the OCR, it is impossible to recognize the characters when characters and image information other than the characters coexist in one document, characters of different character designs coexist in one document, no existing format is available on the writing style or the like.

In addition, even when the document contains necessary data which need to be recognized and unwanted data which require no recognition, the character recognition means also recognizes the unwanted data. For this reason, there is a problem in that time is wasted for recognitions which actually do not need to be carried out, and it is difficult to increase the reading speed.

Especially when the OCR is used to total form sheets to process data on the form sheets by reading characters and the like entered on the form sheets, the conventional OCR requires a long reading time because the OCR also reads the fixed form of the form sheet. Furthermore, there is a problem in that the processing of the read information becomes complex.

SUMMARY OF THE INVENTION

Accordingly, it is a general object of the present invention to provide a novel and useful form sheet reading apparatus in which the problems described heretofore are eliminated.

Another and more specific object of the present invention is to provide a form sheet reading apparatus comprising storing means for storing form information on form sheets, and means for automatically discriminating a frame line of a form sheet which is read and detected by comparing the detected frame line with a frame line information within the form information stored in the storing means, so that data entered within predetermined regions of the form sheet are read under reading conditions determined by the form information for the form sheet. According to the data reading apparatus of the present invention, it is possible to read a plurality of kinds of form sheets having mutually different fixed forms because the discriminating means automatically discriminates the kind of form sheet from the detected frame line. In addition, it is possible to quickly read only the data entered within the predetermined regions of the form sheet based on the form information.

Still another object of the present invention is to provide a data reading apparatus for reading data from a form sheet, where the form sheet has a fixed form with spaces which are to be entered with the data, and the data reading apparatus comprises scanning means for optically scanning the form sheet and for outputting image data read from the form sheet, storing means for storing form informations on different kinds of model form sheets having different fixed forms, discriminating means for discriminating the kind of the form sheet which is scanned by the scanning means by comparing a form information on the form sheet included in the image data from the scanning means with the form informations stored in the storing means, and reading means for reading from the image data outputted from the scanning means data in predetermined reading areas of the form sheet depending on the form information of a model form sheet which is discriminated in the discriminating means as being identical to the kind of form sheet scanned by the scanning means.

Other objects and further features of the present invention will be apparent from the following detailed description when read in conjunction with the accompanying drawings.

BRIEF DESCRIPTION OF THE DRAWINGS

FIG. 22 shows an embodiment of the format of data stored in read result files.

DETAILED DESCRIPTION

Figure 1:
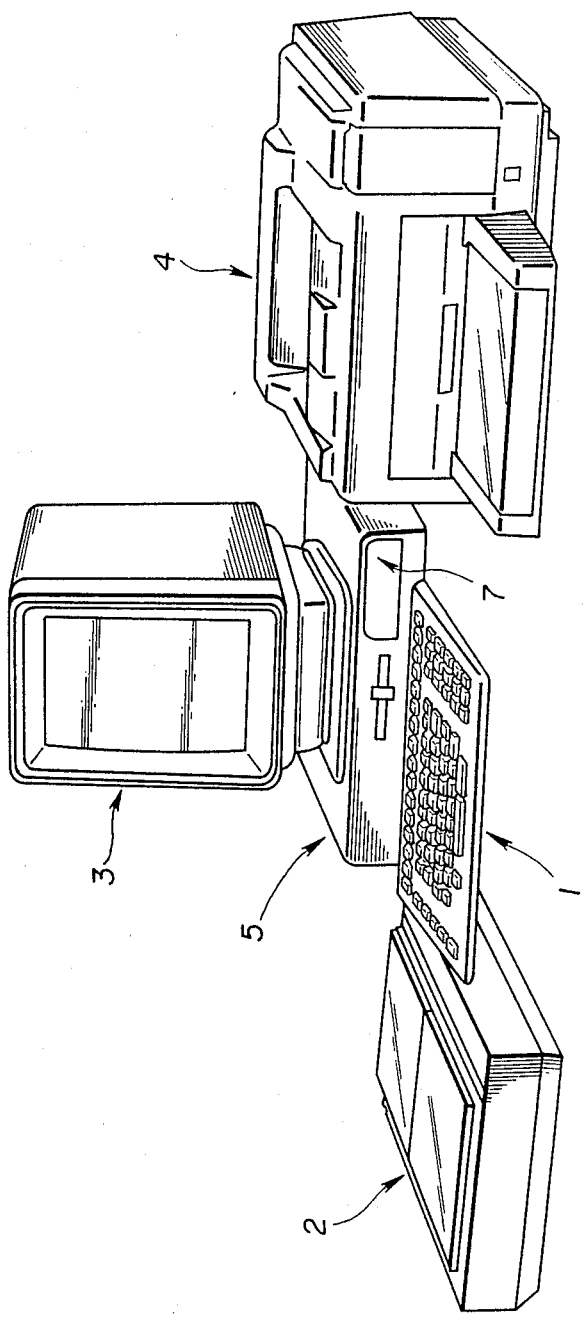
FIG. 1 is a perspective view generally showing an embodiment of the data reading apparatus according to the present invention applied to a data processing system.

FIG. 1 generally shows an embodiment of the data reading apparatus according to the present invention applied to a data processing system.

The data processing system comprises a keyboard 1 for entering instructions of an operator, an image scanner 2, a cathode ray tube (hereinafter simply referred to as CRT) display device 3, a printer 4 and a main processing unit 5.

The keyboard 1 is used as an input device and comprises alpha-numeric keys, Japanese alphabet ("kana") keys, character keys, cursor moving keys, various function keys and the like.

The image scanner 2 optically scans a document and enters image information including character information into the main processing unit 5 as image data.

The CRT display device 3 displays various characters and images including guidances for the operator.

The printer 4 is used to print out various information processed on the data processing system. In the present embodiment, a laser printer which prints the image by use of a laser beam is used as the printer 4.

Figure 2:
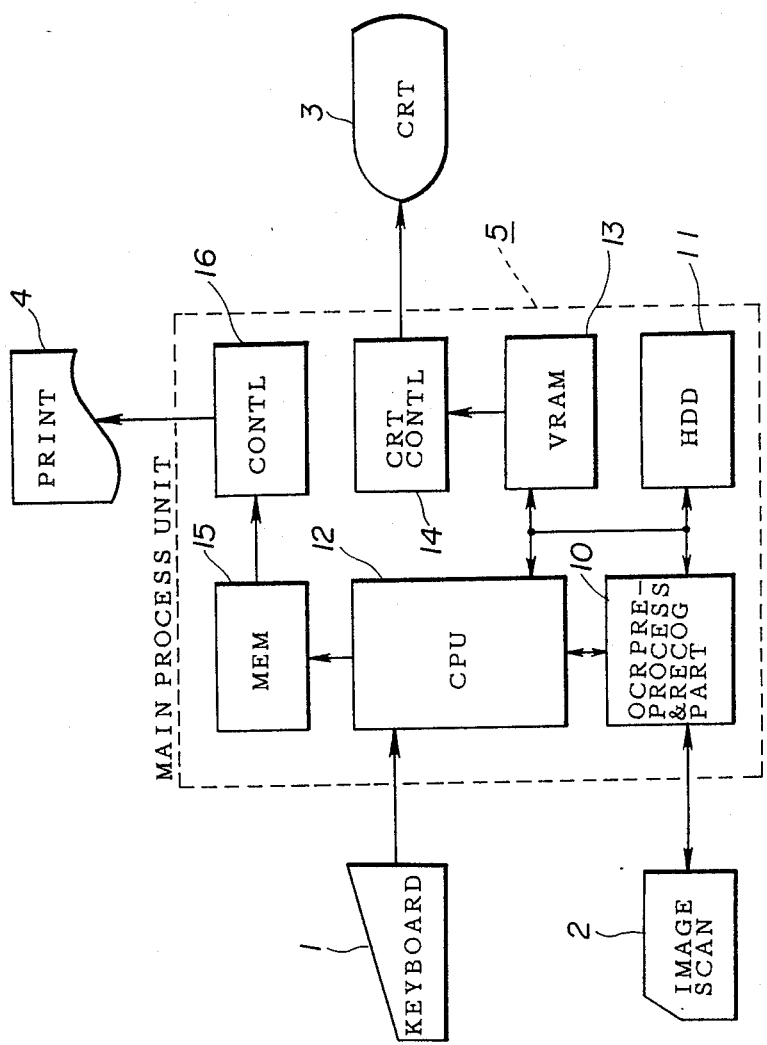
FIG. 2 is a system block diagram showing the data processing system shown in FIG. 1.

As shown in FIG. 2 which shows a system block diagram of the data processing system shown in FIG. 1, the main processing unit 5 comprises an OCR pre-processing and recognition part 10, a hard disc drive (hereinafter simply referred to as HDD) 11, a central processing unit (hereinafter simply referred to as CPU) 12, a video random access memory (hereinafter simply referred to as VRAM) 13, a CRT controller 14, a memory 15 and a printer controller 16.

The part 10 carries out pre-processing and character recognition on the image data received from the image scanner 2, and converts the image data of characters into character code data. Although not shown, the part 10 comprises a buffer memory for temporarily storing the image data entered from the image scanner 2, a dictionary memory for storing dictionaries for recognizing characters and the like.

The HDD 11 is used as a data storage device, and other means for storing data may be used in place of the HDD 11.

The CPU 12 is made up of a microcomputer or the like and controls the operation of the entire data processing system. The CPU 12 carries out a control so that until a code conversion instruction is received from the keyboard 1, the image data of the read document obtained from the image scanner 2 are stored into the HDD 13 as they are through the part 10. After the code conversion instruction is received from the keyboard 1, the CPU 12 controls the part 10 so as to convert the image data of the characters entered from the image scanner 2 into the character code data and to store the character code data into the HDD 11.

The stored image data or character code data are read out from the HDD 11 and are transferred into the VRAM 13 under the control of the CPU 12. The VRAM 13 is used as a video memory for developing the image data or character code data into a dot pattern.

A video signal describing the dot pattern obtained in the VRAM 13 is successively supplied to the CRT controller 12 and is displayed on the CRT display device 3.

The memory 15 is used to temporarily store the image data to be printed out under the control of the CPU 12. The image data to be printed are converted into a form suited for the printing and are supplied to the printer controller 16 which controls the printer 4 to print the image data from the memory 15.

Next, a description will be given on the pre-processing, that is, the designation of reading areas and designation of reading conditions for each reading area.

In the present embodiment, the preprocessing comprises an edit mode, a list mode, and a process end mode. In the edit mode, the reading of the document by the image scanner 2, the reading areas in the document to be read by the image scanner 2, the reading conditions under which the data entered in each reading area are to scanned and the like are designated. In the list mode, the designations made in the edit mode are displayed on the CRT display device 3. The pre-processing is ended in the process end mode.

In the edit mode, there are various submodes such as "document read", "create", "revise", "add", "delete", "display contents" and "end". The submodes "document read", "create" and "display contents" are used to designate the reading areas in the document to be scanned and the reading conditions under which the data entered in each reading area are to be scanned. The contents of the designations may be revised, added or deleted by use of the submodes "revise", "add" and "delete". The submode "end" ends the edit mode.

Figure 3:
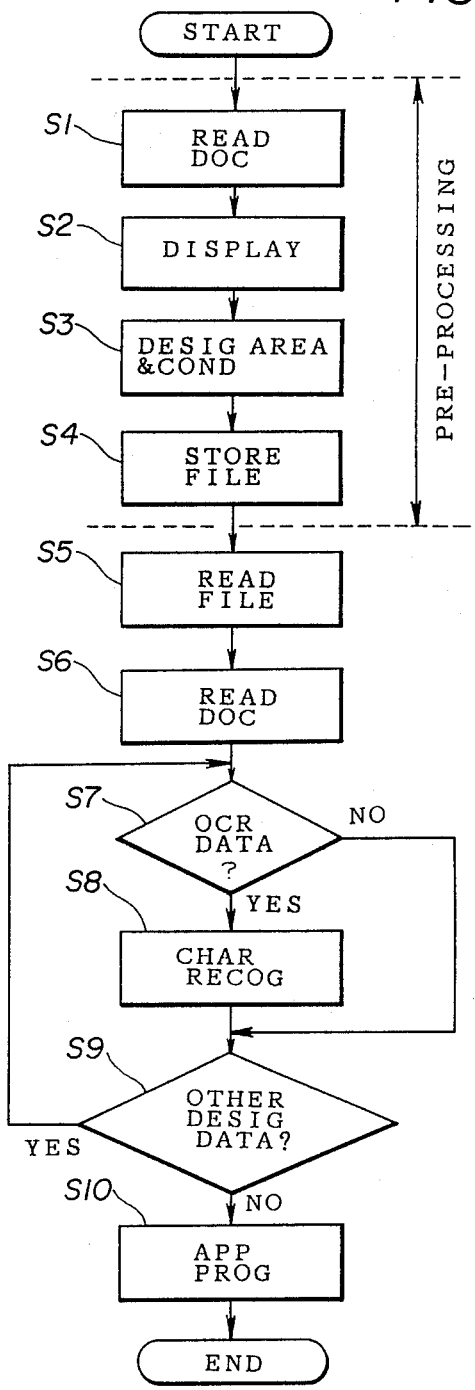
FIGS. 3 and 4A through 4E are flow charts showing embodiments of the operation of a main processing unit of the data processing system shown in FIG. 2.

FIG. 3 is a flowchart showing an embodiment of the operation of the main processing unit 5. A step S1 operates the image scanner 2 to read the image information including characters in the document and enters the read image data into the part 10. In this case, the reading density with which the image information is read is set rough so as to increase the reading speed. A step S2 displays the image data of the document on the CRT display device 3. A step S3 designates the reading areas in the document to be scanned by making sectioning lines or boxes on the screen of the CRT display device 3, and designates the reading conditions under which the data entered in each reading area are to be scanned by entering the reading conditions from the keyboard 1. A step S4 stores the reading areas and reading conditions designated in the step S3 into the HDD 11 in the form of a file.

The designation of the reading areas in the document to be scanned by making sectioning lines or boxes on the screen will be described later. The designation of the reading conditions include the designation of a type mode or a hand-written mode, the designation of the kind of dictionary (character font) in the case of the type mode, the designation of the kind of character in the case of the hand-written mode, the designation of the reading density, the designation of the reading tone and the like. However, a detailed description on the designation of the reading conditions will be given later in conjunction with FIG. 4.

The steps S1 through S4 described above correspond to the pre-processing in the edit mode carried out by the part 10.

Next, a step S5 reads out the stored reading areas and the reading conditions from the file in the HDD 11. A step S6 operates the image scanner 2 again to read the image information from at least the designated reading areas of the document with the designated reading density. A step S7 discriminates whether or not the read image data are to be subjected to the character recognition. Such data to be subjected to the character recognition will be referred hereunder as "OCR data". The operation advances to a step S8 when the read image data are OCR data and the discrimination result in the step S7 is YES, and the step S8 carries out a character recognition. The step S8 selects the dictionary for the character recognition according to the various designated reading conditions and recognizes each character by a known pattern matching method, for example.

On the other hand, when the read image data are not OCR data and the discrimination result in the step S7 is NO, the operation jumps to a step S9. The step S9 discriminates whether or not other designated data exist, and the operation is returned to the step S7 to repeat the process for the character recognition when the discrimination result in the step S9 is YES. When the character recognition of all of the OCR data within the designated reading areas are completed and the discrimination result in the step S9 becomes NO, a step S10 executes an application program, and the operation is thereafter ended.

The steps S5 through S9 described above correspond to the character recognition process.

In the step S8, the character code data obtained by the data conversion carried out during the character recognition, and those image data within the designated reading areas which are not the OCR data, if any, may be stored in the HDD 11, for example.

The application program carries out necessary processings by use of the read data. In this case, the application program processes the data on the form sheet, and such processing includes calculation of tables and totalling of data.

Next, a description will be given on specific examples of the reading areas and the reading conditions which are designated by the pre-processing, by referring to FIGS. 4A through 4E. FIGS. 4A through 4E show an embodiment of the operation of the main processing unit 5.

Figure 4A:
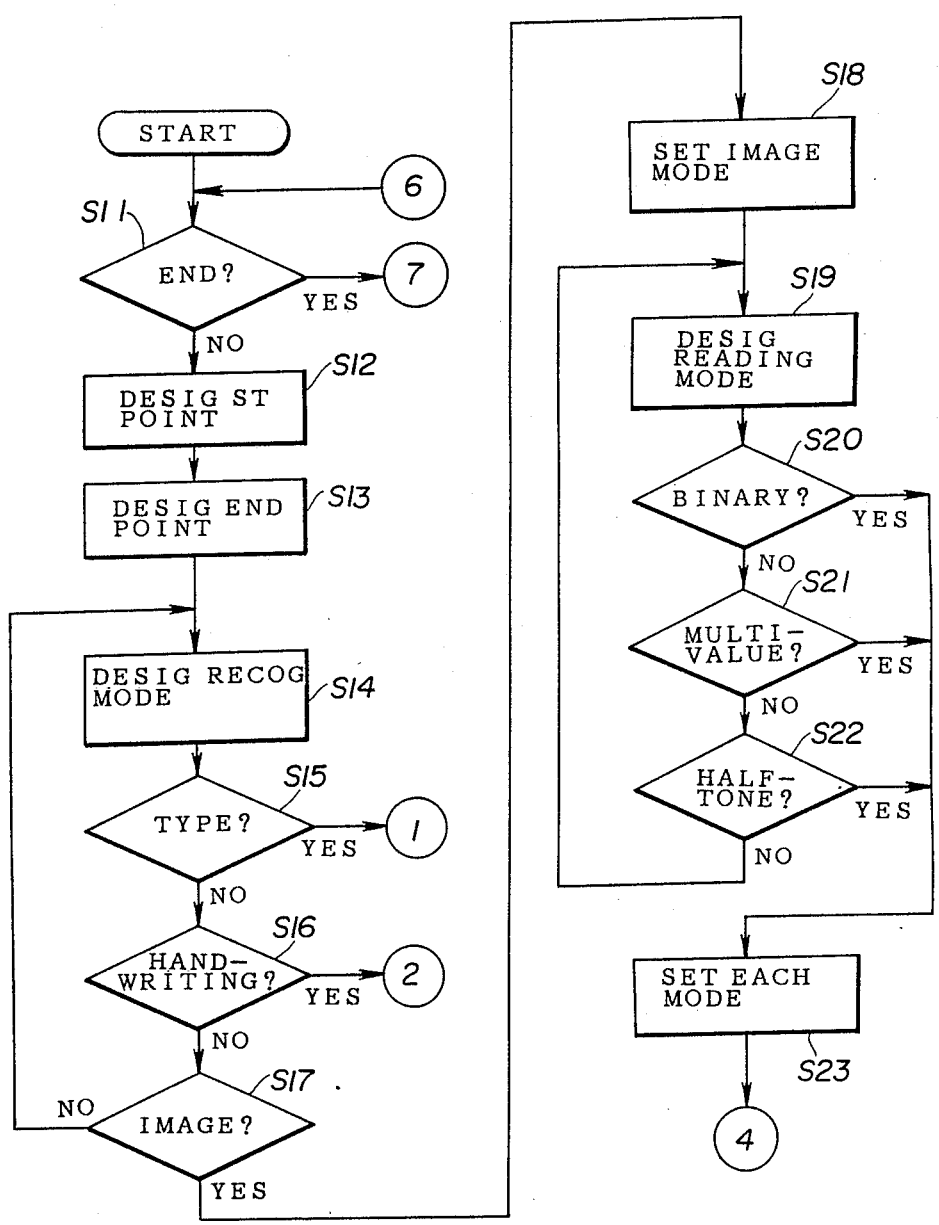

Although not shown, a pre-processing menu is displayed on the CRT display device 3. For example, the pre-processing menu includes the list mode which may be selected by a numeric key "1", the edit mode which may be selected by a numeric key "2" and the process end mode which may be selected by a numeric key 9. In the case where the edit mode is selected by the numeric key "2" of the keyboard 1, an edit menu is displayed on the CRT display device 3. This edit menu includes the submodes described before. The process shown in FIG. 4A is started when the reading of the document by the image scanner 2 is finished and the submode "create" is selected.

A step S11 discriminates whether or not the submode "end" is selected. The submode "end" is selected only when an end key of the keyboard 1 is pushed. Hence, the discrimination result in the step S11 is NO in this case, and steps S12 and S13 designate the reading area.

The image information read from the document by the image scanner 2 is displayed on the CRT display device 3 as the image data, and the reading area is designated by making sectioning lines. In other words, when a start point at a top left of the reading area and an end point at a bottom right of the reading area are designated, it is possible to form a rectangular frame (or box) defined by two parallel horizontal lines respectively passing through the start and end points along the x-direction and two parallel vertical lines respectively passing through the start and end points along the y-direction in the x-y coordinates. A region within the frame is designated as the reading area. The step S12 sets the start point, and the step S13 sets the end point.

Figure 5:
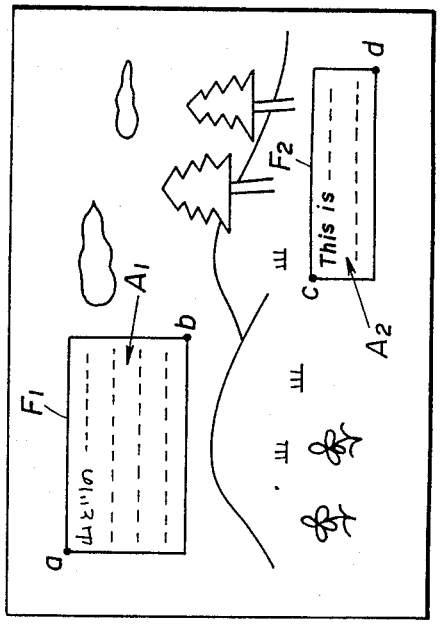
FIG. 5 shows an image of a read document displayed on a CRT display device of the data processing system.

When the displayed image of the read document includes a picture portion and characters on the CRT display device 3 as shown in FIG. 5, for example, it is possible to designate only the writing portion as the reading area by designating a start point a and an end point b to define a rectangular frame (box) $F_1$ thereby designating a reading area $A_1$ within the frame $F_1$ in this case. Similarly, when a start point c and an end point d are designated to define a rectangular frame $F_2$, it is possible to designate a reading area $A_2$ within the frame $F_2$.

There are various methods of designating the start and end points. Examples of such methods are a method of entering x-y coordinates of the start and end points from the keyboard 1, a method of moving a cursor to the start and end points and pushing an execution key of the keyboard 1, and a method of touching by a write pen the screen of the CRT display device 3 at the start and end points.

In the case where the cursor is to be moved, it is possible to move the cursor by pushing cursor moving keys of the keyboard 1 or by using a mouse and the like.

One rectangular area may easily be designated as the reading area by designating two points, namely, the start and end points. It is of course possible to designate a plurality of reading areas.

Next, steps S14 through S17 designate the recognition mode. In this case, although not shown, a recognition mode menu is displayed on the CRT display device 3. For example, the recognition mode menu includes a "type" mode which may be selected by the numeric key "1", a "hand-writing" mode which may be selected by the numeric key "2" and an "image" mode which may be selected by a numeric key 3. The recognition is carried out for one of the "type", "hand-writing" and "image" modes depending on the numeric key which is pushed.

The step S14 designates the recognition mode, the step S15 discriminates whether or not the "type" mode is designated, the step S16 discriminates whether or not the "hand-writing" mode is designated and the step S17 discriminates whether or not the "image" mode is designated.

Figure 4B:
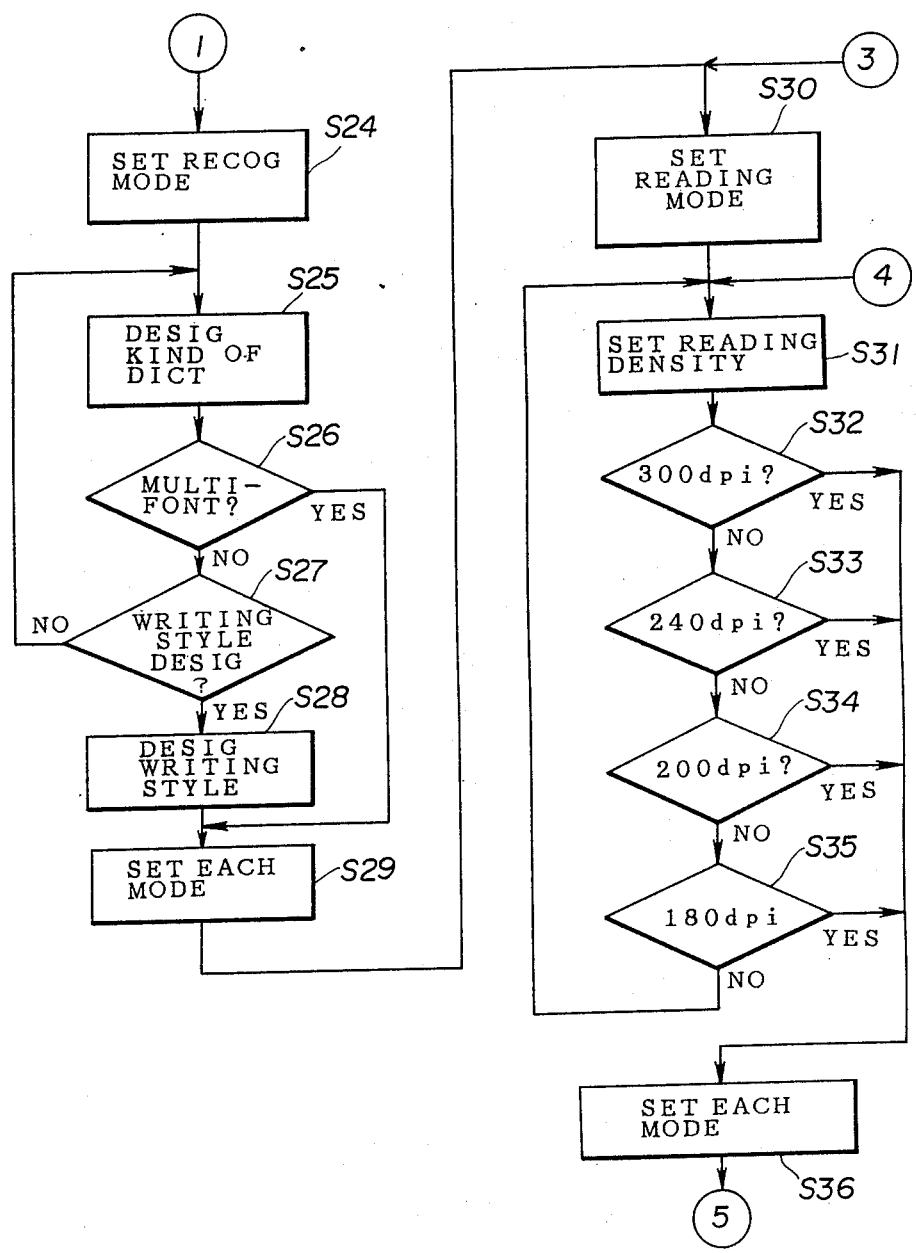

In the case where the "type" mode is selected by the numeric key "1" of the keyboard 1, the discrimination result in the step S15 is YES, and the operation advances to a step S24 shown in FIG. 4B. Steps S24 through S30 set the recognition mode. The step S24 sets the recognition mode, the step S25 designates the kind of dictionary, the step S26 discriminates whether or not the multi-font is designated, the step S27 discriminates whether or not the writing style is designated, the step S28 designates the writing style, the step S29 sets each mode, and the step S30 sets the reading mode.

For example, a dictionary designation menu displayed on the CRT display device 3 includes the multi-font mode which may be selected by the numeric key "1" and the writing style designation mode which may be selected by the numeric key "2". When the multi-font mode is designated, the discrimination result in the step S26 is YES, and the step S29 sets the kind of dictionary to multi-font.

When the multi-font is set, it is possible to automatically discriminate the writing style even when the writing style is unknown, as long as the writing style is one of six predetermined kinds which are frequently used. The kind of dictionary is selected depending on the discriminated writing style, and the character recognition is carried out based on the automatically selected kind of dictionary.

Figure 6:
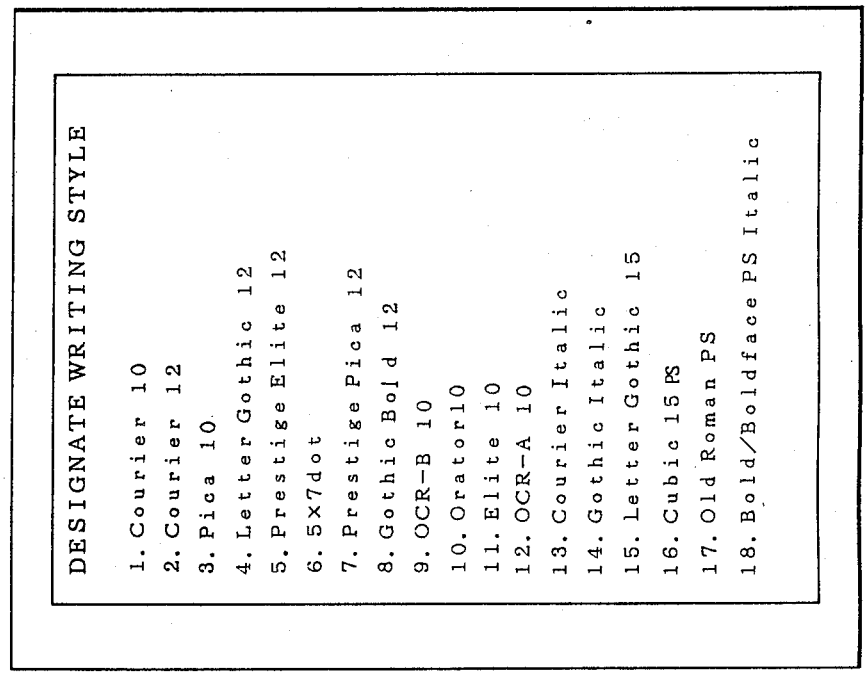
FIG. 6 shows a writing style designation menu displayed on the CRT display device.

On the other hand, when the writing style designation mode is selected, the discrimination result in the step S27 is YES, and a writing style designation menu is displayed on the CRT display device 3. For example, the writing style designation menu permits the selection of the writing style from eighteen kinds of writing styles (fonts) as shown in FIG. 6. When the writing style is designated in the step S28, the step S29 sets the kind of dictionary to the designated writing style.

Figure 4C:
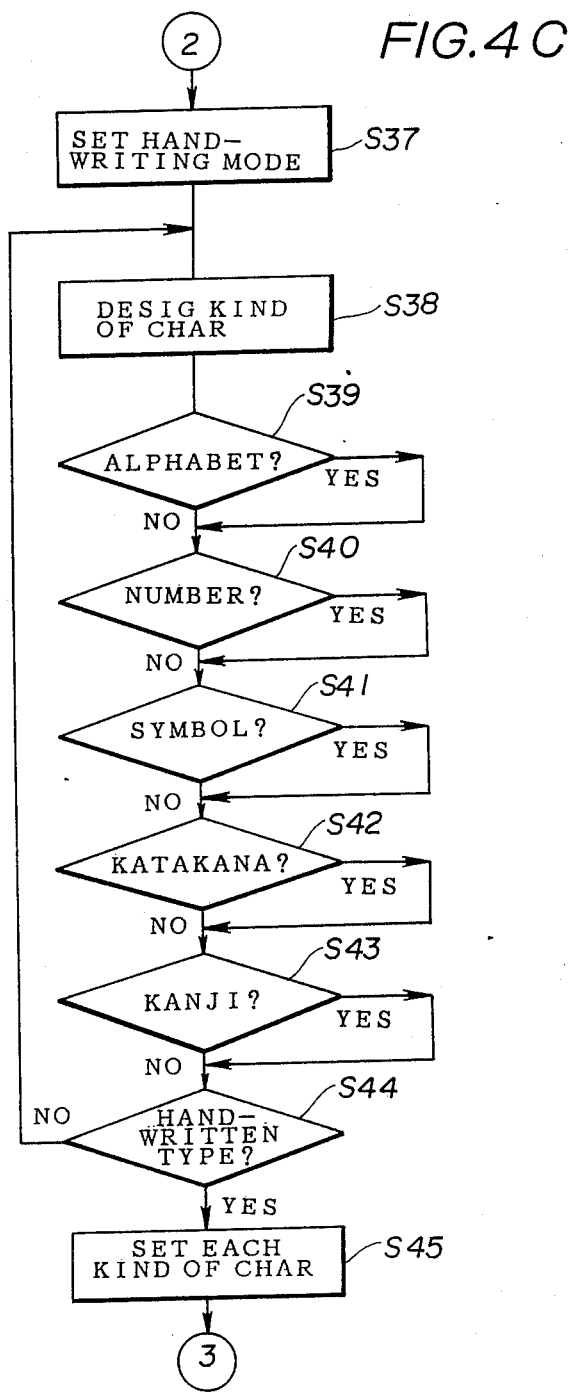

However, when the "hand-writing" mode is designated, the discrimination result in the step S16 is YES, and the operation advances to a step S37 shown in FIG. 4C. Steps S37 through S45 and a step S30 shown in FIG. 4B set the "hand-writing" mode. For example, a hand-writing kind designation menu displayed on the CRT display device 3 includes "alphabet" which may be selected by the numeric key "1", "number" which may be selected by the numeric key "2", "symbol" which may be selected by the numeric key "3", "Japanese alphabet ("kana")" which may be selected by the numeric key "4", "Chinese character ("kanji")" which may be selected by the numeric key "5", "hand-written type" which may be selected by the numeric key "6", and "end" which may be selected by the numeric key "9".

In this case, when a plurality of kinds of characters such as alphabets, numbers and symbols coexist within the same area, it is possible to designate all of the kinds of characters.

The "hand-written type" refers to characters which are hand-written according to a predetermined form to resemble the type.

On the other hand, when the "image" mode is selected, the discrimination result in the step S17 is YES, and the operation advances to a step S18 shown in FIG. 4A. Steps S18 through S23 designate the reading mode. A reading mode selection menu is displayed on the CRT display device 3 so that the reading mode may be selected from the "binary", "multi-value" and "half-tone" modes by pushing a corresponding numeric key of the keyboard 1.

The "binary" mode reads the image data as binary values (1 or 0), that is, black or white, depending on whether or not the signal level is greater than a predetermined threshold level. The "multi-value" mode reads the image data as multigradation data of 64 gradation levels, for example. The "half-tone" mode reads the image data as pseudohalf-tone data by converting the read data into binary data by use of a dither matrix.

When the "type" mode or the "hand-writing" mode is set, the reading mode is automatically set to the "binary" mode.

After the step S23 shown in FIG. 4A or the step S30 shown in FIG. 4B, steps S31 through S36 shown in FIG. 4B set the reading density. In this case, a reading density selection menu is displayed on the CRT display device 3 so that the reading density mode may be selected to one of 300 dpi (dots/inch), 240 dpi, 200 dpi and 180 dpi by pushing a corresponding numeric key of the keyboard 1.

Figure 4D:
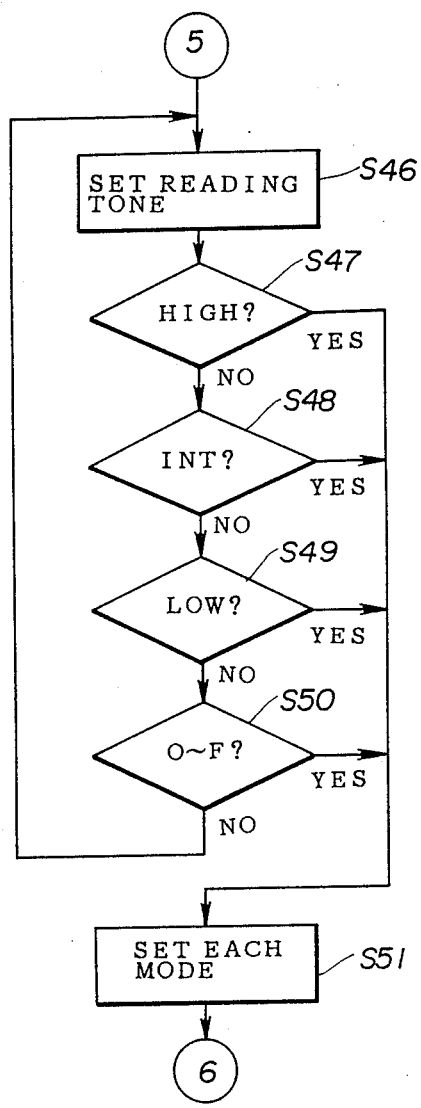
Figure 4E:
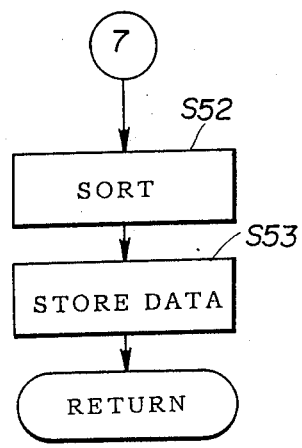

After the step S36, the operation advances to a step S46 shown in FIG. 4D. Steps S46 through S51 set the reading tone. In this case, a reading tone selection menu is displayed on the CRT display device 3 so that the reading tone may be selected to one of high (dark) tone, intermediate (medium) tone and low (light) tone or to one of sixteen intermediate gradation levels "0" to "F" between two tones. It is possible to normally set the reading tone to intermediate tone, and set the reading tone to the high and low tones when the characters of the document are light and dark, respectively.

The operation returns to the step S11 shown in FIG. 4A when all of the reading conditions for one designated reading area are designated. Then, another reading area is designated, and the reading conditions for this other reading area are designated similarly. When all of the reading areas and all of the reading conditions therefor are designated and the end key of the keyboard 1 is pushed, the operation advances to a step S52 shown in FIG. 4E.

The step S52 rearranges the set area information (coordinates of the start and end points of the reading area and the information on each of the reading conditions set for the reading area) according to a scanning sequence of the image scanner 2, and a step S53 adds file names or the like to the set area information and stores the set area information in the files of the HDD 11. After the step S53, the CRT display device 3 displays an edit menu.

Thereafter, when the contents of the area information need to be revised, a revise menu is selected from the edit menu. In this case, the file name is designated to display the contents of the area information on the CRT display device 3, and the revising item is selected to revise the content.

When an area information needs to be added, the submode "add" is selected from the edit menu. The area information is added similarly as in the case of the submode "create", and the added area information is stored in the files of the HDD 11.

When a portion of the area information needs to be deleted, the submode "delete" is selected from the edit menu. In this case, all of the designated reading areas are displayed on the CRT display device 3, and the area information of a certain reading area to be deleted is picked by moving the mouse into the certain reading area, for example, and the area information is deleted.

Next, a description will be given on the structure of the files for storing the area information set as described before, by referring to FIG. 7.

Figure 7:
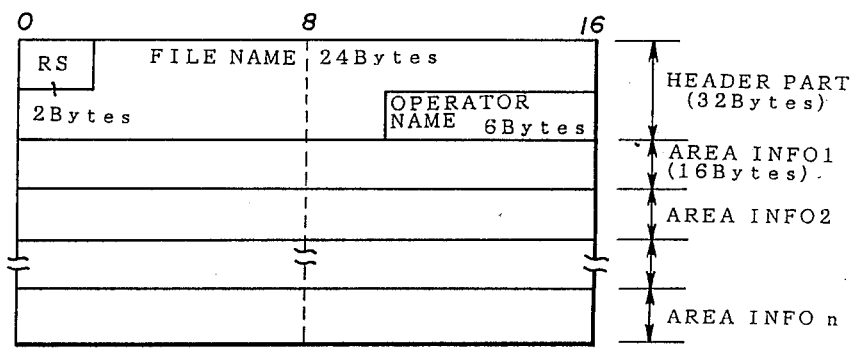
FIG. 7 shows an embodiment of the structure of files for storing area information.

Each file comprises a 32-byte header part in which the file name and the operator name are entered by the operator, and n 16-byte area information storage parts which follow the header part. The area information is written into the area information storage parts in the sequence in which the reading areas are scanned by the image scanner 2. In FIG. 7, a 2-byte discrimination code is provided for use in discriminating the files.

Figure 8:
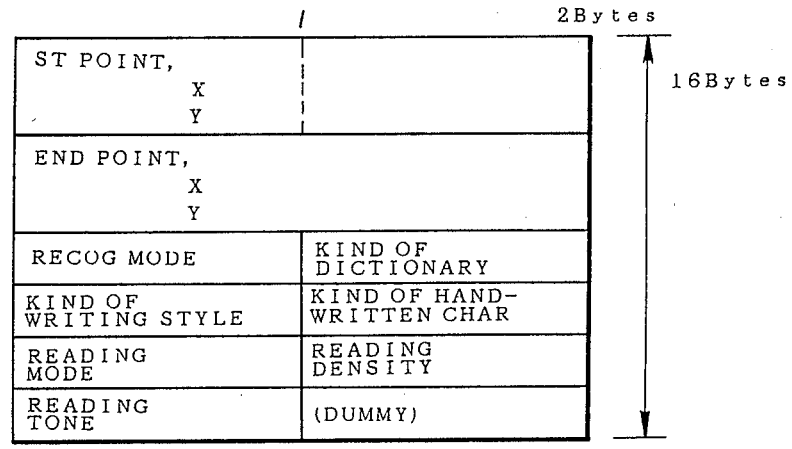
FIG. 8 shows an embodiment of the structure of the area information.

As shown in FIG. 8, each area information comprises a 4-byte coordinate information made up of 2-byte x-coordinate information and 2-byte y-coordinate information on the start and end points of the reading area, seven 1-byte reading condition designating information made up of the recognition mode, the kind of dictionary, the kind of writing style, the kind of hand-written character, the reading mode, the reading density and the reading tone, and a 1-byte dummy region.

Figure 9:
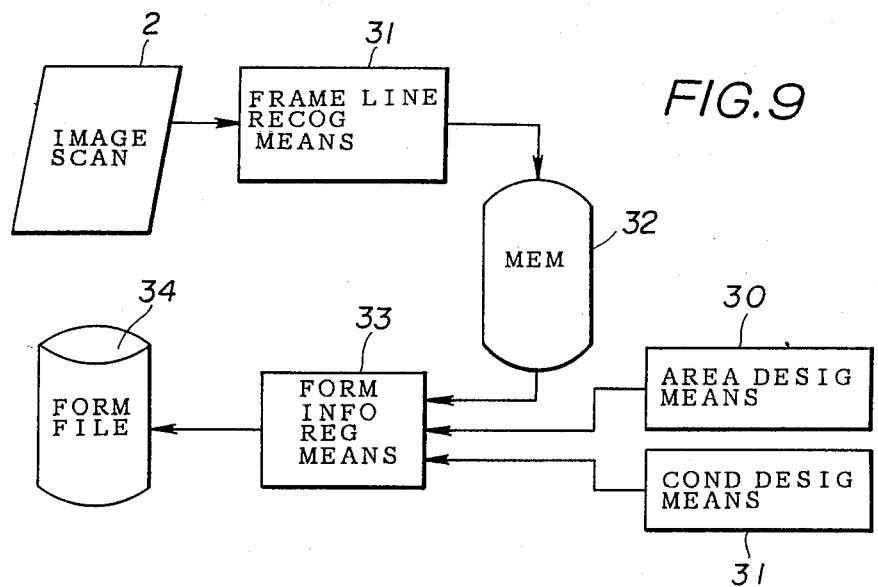
FIG. 9 is a functional block diagram showing essential functions of the embodiment for registering form information.
Figure 10:
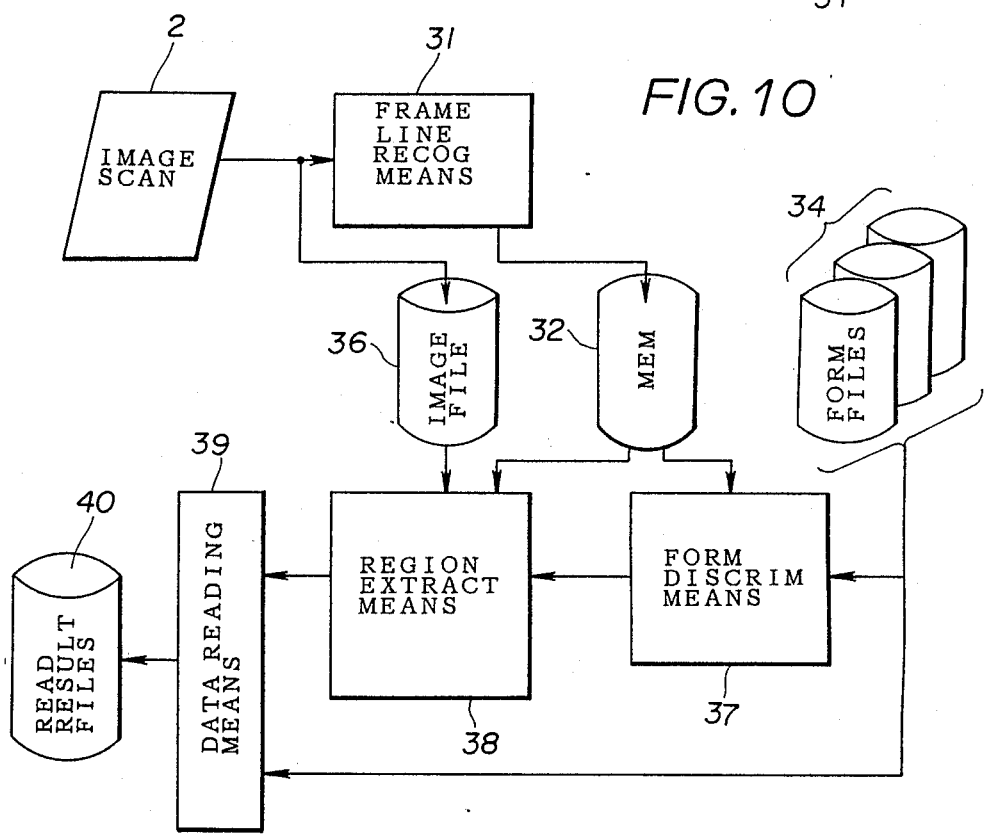
FIG. 10 is a functional block diagram showing essential functions of the embodiment for reading data from the form sheet.

Next, a description will be given on the operation of totalling the form sheets by reading the entered characters and the like from the form sheets, by referring to FIGS. 9 and 10. FIG. 9 is a functional block diagram showing the essential functions of the embodiment of the data reading apparatus (data processing system) for registering form information including the information on the reading areas and the reading conditions for each reading area. On the other hand, FIG. 10 is a functional block diagram showing the essential functions of the embodiment of the data reading apparatus for reading the data from the form sheets.

In FIG. 9, reading area designating means 30 and reading condition designating means 31 constitute the keyboard 1. On the other hand, frame line recognition means 31, frame line data memory 32, form information registering means 33 and form file 34 constitute the main processing unit 5.

In the present embodiment, it is necessary to register the form information for each kind of form sheet from which the data are to be read.

Hence, a model form sheet is set in the image scanner 2, and the frame line of the model form sheet is recognized by the frame line recognition means 31 from the image data received from the image scanner 2. The frame line, that is, the fixed form, is recognized from the boxes and lines on the form sheet. The frame line information recognized in the frame line recognition means 31 is temporarily stored in the frame line data memory 32.

The recognized frame line is displayed on the CRT display device 3, and the operator designates the reading area by the reading area designating means 30 based on the displayed frame line. Further, the operator designates the reading conditions for each reading area by the reading condition designating means 31. The information on the designated reading area and the information on the reading conditions therefor are registered in the form file 34 as form information on the form sheet by the form information registering means 33.

Such a process of registering the form information is carried out for each kind of form sheet from which the data are to be read. As a result, the form information is registered for each kind of form sheet.

In FIG. 10, the frame line recognition means 31, the fixed form data memory 32, form files 34, an image file 36, form discriminating means 37, region extracting means 38, data reading means 39 and read result files 40 constitute the main processing unit 5. The form files 34 and the read result files 40 correspond to the HDD 11, and the data reading means corresponds to the part 10.

When reading the data from the form sheet, the form sheet is set in the image scanner 2 and scanned. The image data from the image scanner 2 is temporarily stored in the image file 36, and the frame line recognition means 31 recognizes the frame line from the image data stored in the image file 36 and temporarily stores the frame line data of the recognized frame line in the frame line data memory 32.

The form discriminating means 37 successively reads the frame line information within the form information registered in the form files 34, and compares the frame line information with the frame line information stored in the frame line data memory 32. The frame line of the form sheet is discriminated by finding a matching frame line data, and the form discriminating means 37 outputs the information on the reading areas designated with respect to the discriminated frame line.

The region extracting means 38 extracts the data in the area (region) in which the character recognition is to be made from the image data stored in the image file 36, based on the discriminated information including the information on the designated reading areas and information on reference positions of the frame line information obtained from the frame line data memory 32. The extracted data are supplied to the data reading means 39.

The data reading means 39 reads from the form files 34 the area information on the frame line discriminated by the form discriminating means 37, and selects the dictionary for character recognition according to the information on the designated reading conditions for each area. The data reading means 39 recognizes the character from the image data extracted by the region extracting means 38 and successively converts the recognized character into character code data. The character code data are stored in the read result files 40.

In the case where the reading condition is set to the "image" mode, the image data within the reading area are stored in the read result files 40 according to the designated reading mode as binary, multi-value or pseudo-half-tone (pseudo-binary) data.

The functions shown in FIGS. 9 and 10 are carried out mainly by the part 10 and the CPU 12 of the main processing unit 5 shown in FIG. 2. But an embodiment of the operation of the main processing unit 5 for registering the form information and an embodiment of the operation of the main processing unit 5 for reading the data from the form sheet will now be described by referring to FIGS. 11 and 12, respectively.

Figure 11:
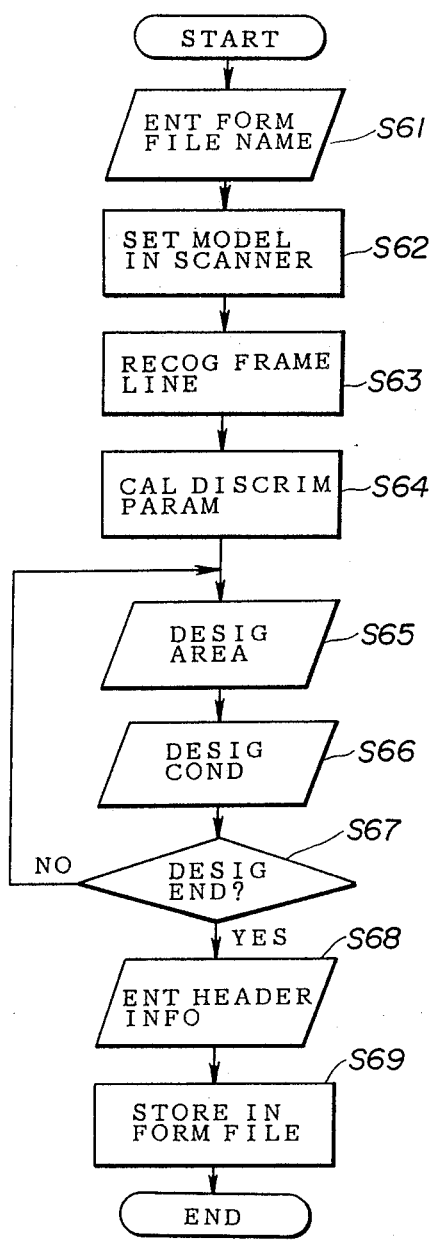
FIG. 11 is a flow chart showing an embodiment of the operation of the main processing unit for registering form information.
Figure 12:
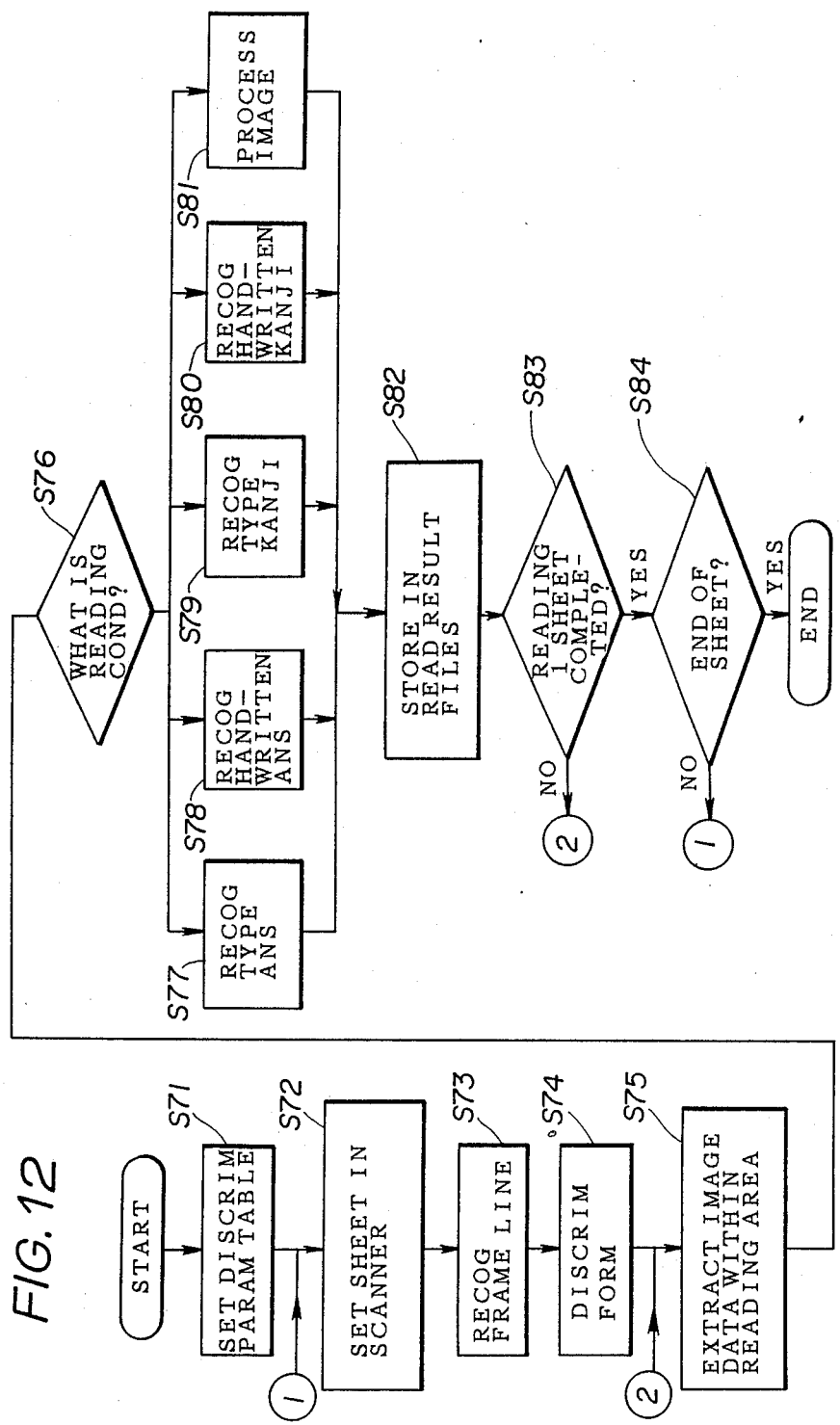
FIG. 12 is a flow chart showing an embodiment of the operation of the main processing unit for reading data from the form sheet.

In the flow charts shown in FIGS. 11 and 12, the operation carried out by the operator and the operation carried out by the data reading apparatus are shown together in the sequence of the steps for convenience' sake.

First, the operation of registering the form information will be described in conjunction with FIG. 11, by referring also to FIGS. 13 through 19. When the process of registering the form information starts, the operator enters the form file name in a step S61 to designate the file name under which the form information is to be registered. The operator sets in the image scanner 2 the model form sheet which is to be registered in a step S62.

A step S63 recognizes the frame line from the image data from the image scanner 2 which reads the image information from the set model form sheet. Various methods of recognizing the frame line have been proposed, and examples of such are disclosed in Japanese Laid-Open Patent Applications No.57-211672 and No. 57-211674. It will be assumed in the present embodiment that a pair of line segments in a main scanning direction (x-direction) on the document and a pair of line segments in a sub scanning direction (y-direction) surrounding a rectangular region are recognized as line segments constituting the frame line, as long as no boxes exist within the rectangular region.

Figure 13:
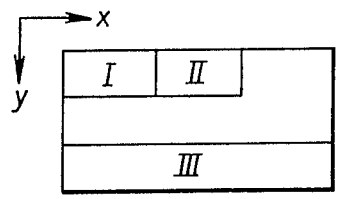
FIG. 13 shows an example of a frame line.

For example, in the case shown in FIG. 13, the line segments indicated by solid lines and surrounding rectangular regions I, II and III are recognized as frame line.

Figure 14:
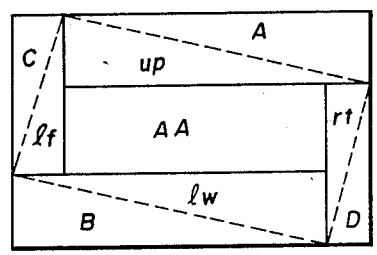
FIG. 14 shows a case where a skew exists in the image data read by an image scanner.

In the case where the image data received from the image scanner 2 includes a skew, the image of each line segment constituting the original frame line becomes inclined with respect to the image as indicated by phantom lines in FIG. 14. Hence, four rectangles A, B, C and D surrounding all of the dots constituting the respective line segments indicated by the phantom lines are generated, and line segments up at the top, lw at the bottom, lf at the left and rt at the right indicated by solid lines which surround a rectangular region AA are recognized as the frame line.

The character recognition becomes difficult when the skew becomes large. For this reason, a message is displayed on the CRT display device 3 when the skew is excessively large, so that the operator may correctly set the form sheet in the image scanner 2.

For example, it is known from Japanese Laid-Open Patent Application No. 58-87652 to detect the skew in the image data and to obtain corrected image data. Thus, it is possible to prevent the undesirable reduction in the reading area due to the skew by utilizing such techniques.

Next, a step S64 calculates discriminating parameters. In other words, the discriminating parameters for discriminating the form of the fixed form sheet are determined and the reference position is found.

Figure 15:
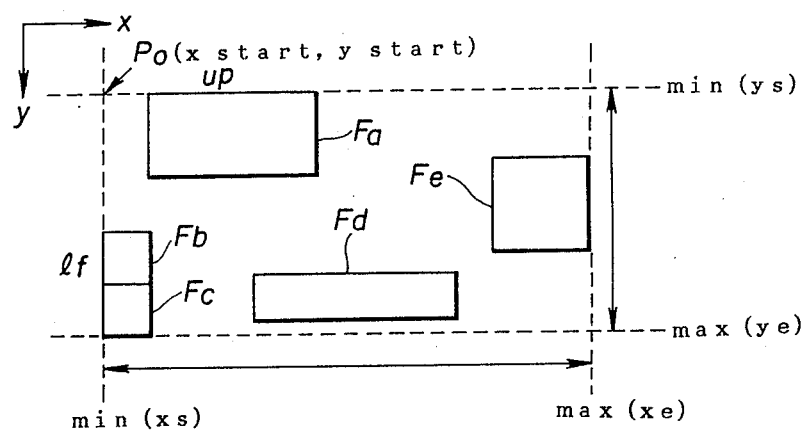
FIG. 15 is a diagram for explaining a reference position of the frame line.

The coordinates of a reference position Po shown in FIG. 15 will be denoted by $(x_{start}, y_{start})$. In FIG. 15, the reference position Po is an intersection of an extension of a top line segment up of an uppermost fixed form Fa out of fixed forms Fa through Fe and an extension of a left line segment lf of the leftmost fixed form Fb and Fc.

The coordinates of the start and end points of each line segment and each reading area are all described with reference to the reference position Po. Hereunder, the coordinates of the start and end points of a line segment will respectively be denoted by $(x_s, y_s)$ and $(x_e, y_e)$, and the coordinates of the start and end points of a reading area (region) will respectively be denoted by $(ax_s, ay_s)$ and $(ax_e, ay_e)$.

The following six parameters (1) through (6) are obtained in the present embodiment as discriminating parameters.

(1) Reading density: In the present embodiment, the reading density of the image scanner 2 when entering the image data from the image scanner 2 is selected to one of 180, 200, 240 and 300 dpi.

(2) Width along x-direction: As shown in FIG. 15, the width along the x-direction is a difference $\max(x_e) - \min(x_s)$, where $\max(x_e)$ denotes the maximum x-coordinate of the end point of the line segment and $\min(x_s)$ denotes the minimum x-coordinate of the start point of the line segment.

(3) Width along y-direction: As shown in FIG. 15, the width along the y-direction is a difference $\max(y_e) - \min(y_s)$, where $\max(y_e)$ denotes the maximum y-coordinate of the end point of the line segment and $\min(y_s)$ denotes the minimum y-coordinate of the start point of the line segment.

(4) Number of frames: The number of frame is a number l of frames recognized in the frame recognizing process.

(5) Number of line segments along x-direction: The number of line segments along the x-direction is a number m of line segments recognized in the frame recognizing process.

(6) Number of line segments along y-direction: The number of line segments along the y-direction is a number n of line segments recognized in the frame recognizing process.

Next, a step S65 designates the reading areas and a step S66 designates the reading conditions. In the case where an area $A_{in}$ shown in FIG. 16A surrounded by a recognized frame F is to be designated as the reading area, the inside of each of the plurality of frames displayed on the CRT display device 3 are successively displayed in reverse display form (or highlighted) one by one, and waits for an entry from the keyboard 1 by the operator. For example, it is possible to successively select whether or not the the area displayed in the reverse display form is to be designated as the reading area by pushing either one the numeric keys "1" and "0" or either one of the execution and cancel keys of the keyboard 1. As a result, the designation of the reading area becomes simple in that there is no need to enter the coordinates of the start and end points of the reading area.

Figure 16A:
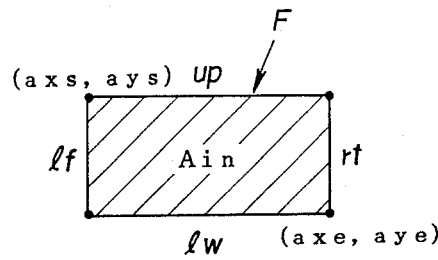
FIGS. 16A through 16D are diagrams for explaining the designation of the reading area.
Figure 16B:
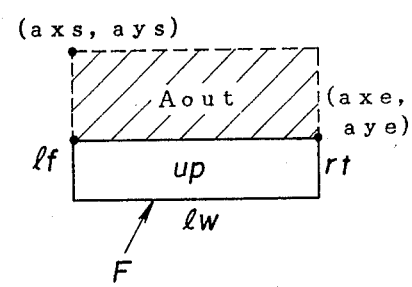

In the case where a rectangular area $A_{out}$ shown in FIG. 16B is to be designated as the reading area, where the rectangular area $A_{out}$ is located outside the frame F and has as one of the sides thereof a line segment constituting the frame F, it is possible to simply enter the coordinate (the y-coordinate $ay_s$ in this case) which is different from the coordinate of the start or end point of the line segment which constitutes one side of the frame F out of the coordinates of the start or end points outside the rectangular area $A_{out}$.

Figure 16C:
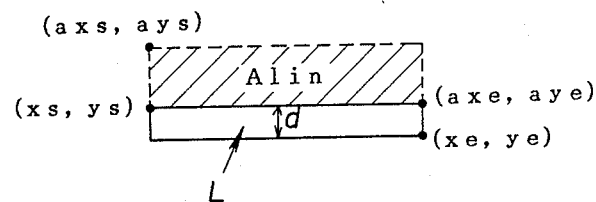

In addition, in the case where a rectangular area $A_{lin}$ shown in FIG. 16C which has as one of the sides thereof a line segment L recognized outside the frame, the rectangular area $A_{lin}$ may similarly be designated as the reading area. However, since the line segment L will be recognized as an elongated rectangle having the start point $(x_s, y_s)$ and its diagonal point as the end point $(x_e, y_e)$, where a width d of the elongated rectangle is caused by the deviation of the line, slight skew or noise, the coordinates $(ax_e, ay_e)$ of the end point of the reading area $A_{lin}$ slightly differ from the coordinates $(x_e, y_e)$ of the end point of the line segment L. But it is possible to automatically determine the coordinates of the end point of the reading area $A_{lin}$ because $ax_e = x_e$ and $ay_e = y_e - d = y_s$.

Figure 16D:
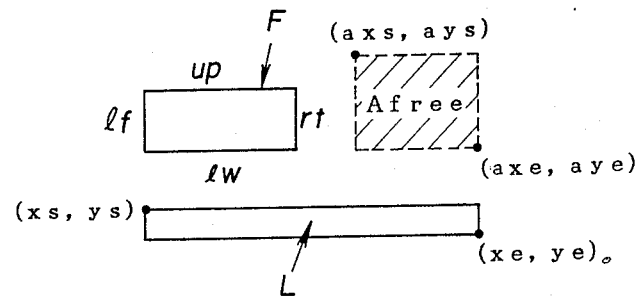

Furthermore, when freely designating a reading area $A_{free}$ shown in FIG. 16D independently of the recognized frame F or the line segment L, the coordinates $(ax_s, ay_s)$ and $(ax_e, ay_e)$ of the start and end points of the area are entered as described before in conjunction with the steps S12 and S13 shown in FIG. 4.

The reading conditions are designated after the designation of each reading area, in accordance with the flow chart described before with reference to FIG. 4. In other words, the designation of the "type" or "hand-writing" mode, the designation of the writing style (font) in the case of the "type" mode, the designation of the kind of character in the case of the "hand-writing" mode and the like are carried out successively. In this case, the designations of the reading density and the reading tone are not carried out.

When the designation of the reading areas and the designation or setting of the reading conditions are completed for each of the reading areas, a discrimination result in a step S67 shown in FIG. 11 becomes YES and the operation advances to a step S68. The step S68 enters the header information. A version number, format name, operator name and other memos are entered as the header information.

In a step S69, each of the data, that is, the format information, are stored in the form files 34 according to a form file format, and the process of registering the form information is ended.

Figure 17:
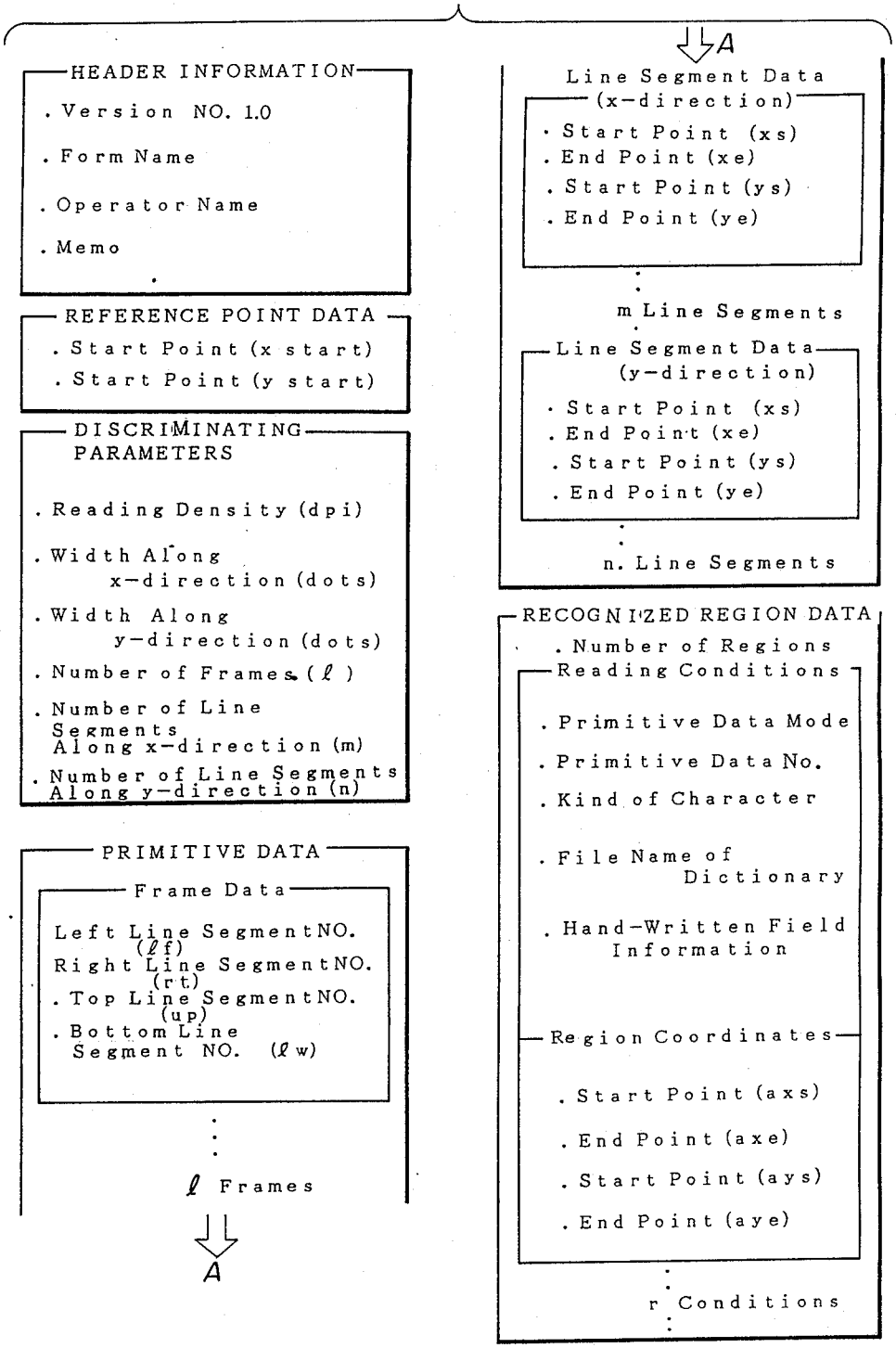
FIG. 17 shows an embodiment of the form file format.

The form file format comprises header information, reference point data, discriminating parameters, primitive data and each of areas of the recognized region data as shown in FIG. 17.

The header information is the information entered by the operator as described before. The reference point data corresponds to the coordinates $(x_{start}, y_{start})$ of the reference position Po shown in FIG. 15.

The discriminating parameters were described before, and in this case, the widths along the x-direction and y-direction are stored as the number of dots. The length can be calculated from the number of dots and the reading density.

The frame data on the number l of recognized frames, the x-direction line segment data on the number m of recognized line segments along the x-direction, and the y-direction line segment data on the number n of recognized line segments along the y-direction are respectively added with a frame number or a line segment number and stored as the primitive data. The frame data are stored in numbers of the four line segments lf, rt, up and lw defining the frame. The line segment data are stored in x-y coordinates of the start and end points of each line segment.

The recognized region data relate to the reading areas described before. Hence, the number of regions (number of regions designated as the reading area), the number r of reading conditions and the region coordinates are stored as the recognized region data.

The primitive data mode, primitive data number, kind of character, file name of dictionary, file name of handwritten field and the like are the reading conditions.

In the primitive data mode, a designation is made to determine whether the reading area belongs to a line segment or a frame or is a completely free area. The primitive data number is the line segment number or the frame number to which the data belongs.

Figure 18:
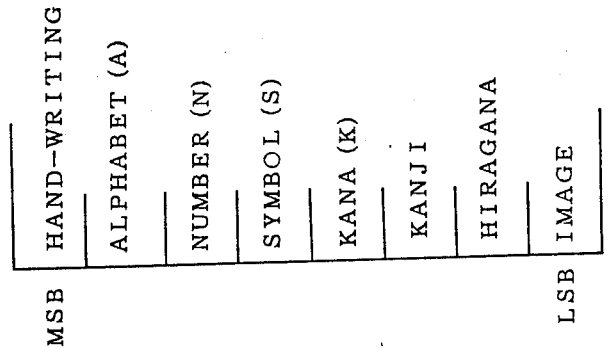
FIG. 18 shows an embodiment of the data on the kind of character.

The data on the kind of character designate the "hand-written" mode by setting the most significant bit (hereinafter referred to as MSB) of the 8-bit memory area to "1" and designate the "image" mode by setting the least significant bit (hereinafter referred to as LSB) to "1", as shown in FIG. 18. Furthermore, the second MSB designates the alphabet (A), the third MSB designates the numbers (N), the fourth MSB designates the symbols (S), the fifth MSB designates the Japanese alphabets ("kana") (K), the sixth MSB designates the Chinese characters ("kanji") and the seventh MSB designates the Japanese alphabets ("hiragana"). Each of the eight bits designate the corresponding kind of character by being set to "1", and a plurality of bits may be set to "1". But in the "type" mode, the MSB and LSB are not set to "1".

The file name of the dictionary in accordance with the designated writing style in the "type" mode is stored as the file name of the dictionary.

Figure 19:
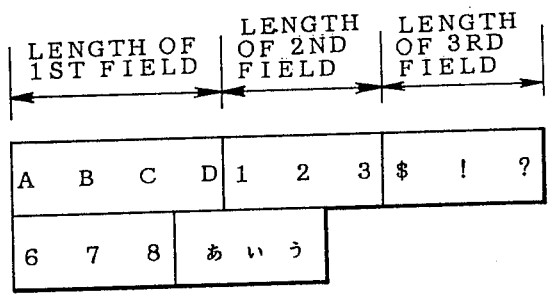
FIG. 19 shows an embodiment of the hand-written field information.

In order to improve the recognition rate of the handwritten characters, each line is sectioned for each kind of character such as alphabets, numbers, symbols and the like, and the length of each section is successively stored as field data in an independent file, as shown in FIG. 19. The handwritten field information is used to read such data from the independent file.

The region coordinates are the coordinates $(ax_s, ay_s)$ and $(ax_e, ay_e)$ of the start and end points of the reading area.

Next, the process of reading the data from the form sheet will be described in conjunction with FIG. 12, by referring also to FIGS. 20 through 22.

When the process of reading the data from the form sheet starts, a step S71 shown in FIG. 12 sets a discriminating parameter table. In other words, the discriminating parameters are read out from the registered form in the form files 34 together with the form file name and stored in a table.

Then, the operator sets the form sheet which is to be read in the image scanner 2 in a step S72. In the case where an automatic paper feeder (not shown) is provided on the image scanner 2, it is possible to set a plurality of form sheets at one time. Further, as long as the form information on the different kinds of form sheets are registered beforehand, a plurality of form sheets of different kinds may coexist in the set stack of form sheets to be scanned in an arbitrary sequence independent of the kind of form sheet, that is, independent of the fixed form.

The first form sheet which is set is scanned by the image scanner 2 with predetermined density and reading tone, and the image data from the image scanner 2 are entered into the main processing unit 5. Hence, in a step S73, the frame line recognition means 31 recognizes the line segments as described before, and carries out the process of recognizing the frame line which surrounds one rectangular area by four line segments as described before in conjunction with FIG. 10.

Next, a step S74 discriminates the form of the form sheet. A more detailed description on the discrimination of the form of the form sheet will be given later in conjunction with FIGS. 20 and 21.

Then, a step S75 extracts the image data within the reading area. In other words, the position of the input image data stored in the image file 36 are normalized with reference to the reference position obtained as a result of the frame line recognition carried out by the frame line recognition means 31.

A step S76 discriminates the reading method suited for the reading conditions for each reading area. One of steps S77 through S81 is carried out depending on the discrimination result in the step S76. The step S77 recognizes the type alphabet, number and symbol (hereinafter simply referred to as ANS), and the step S78 recognizes the hand-written ANS. The step S79 recognizes the type Chinese character ("kanji"), the step S80 recognizes the hand-written Chinese character ("kanji"), and the step S81 processes the image data into binary or multi-value data.

The character recognition in one of the steps S77 through S81 is made by carrying out a pattern matching with the dictionary for the character recognition of the designated writing style in the case of the "type" mode. But in the case of the hand-written character, a dictionary for character recognition of hand-written characters is prepared beforehand, and the character recognition is made by carrying out a pattern matching based on this dictionary and the hand-written field data described before.

A step S82 stores in the read result files 40 the recognized characters as character code data and the image data as bit maps according to a format shown in FIG. 22.

A step S83 discriminates whether or not the reading of data from one form sheet is completed. The operation is returned to the step S75 when the discrimination result in the step S83 is NO. On the other hand, when the discrimination result in the step S83 is YES, a step S84 discriminates whether or not all of the form sheets set in the image scanner 2 are read. When the discrimination result in the step S84 is NO, the operation is returned to the step S72.

Therefore, the process of successively extracting the image data within the designated reading areas and storing the read results in the files is repeated until the reading of data from one form sheet is completed. When the reading of data from one sheet is completed, the next form sheet is fed into the image scanner 2 by the automatic paper feeder to start reading data from this next form sheet. Such a process is repeated until the reading of data from all of the form sheets is completed. As a result, the data in all of the designated reading areas of all of the form sheets are read, and the results of the recognition are stored in the read result files 40.

Next, the form discriminating process will be described in conjunction with FIGS. 20 and 21. The form discriminating process is carried out according to the flow chart shown in FIG. 20, and a step S91 first carries out a parameter evaluation.

The parameter evaluation is carried out as follows. The discriminating parameters of the registered form for each form sheet are compared with the discriminating parameters of the form sheet which is subjected to the frame line recognition, and those parameters which perfectly coincide as for the reading density and the number of frames and fall within the same predetermined tolerable ranges as for the remaining parameters are selected. The number of selected forms is denoted by $n_1$.

Figure 21:
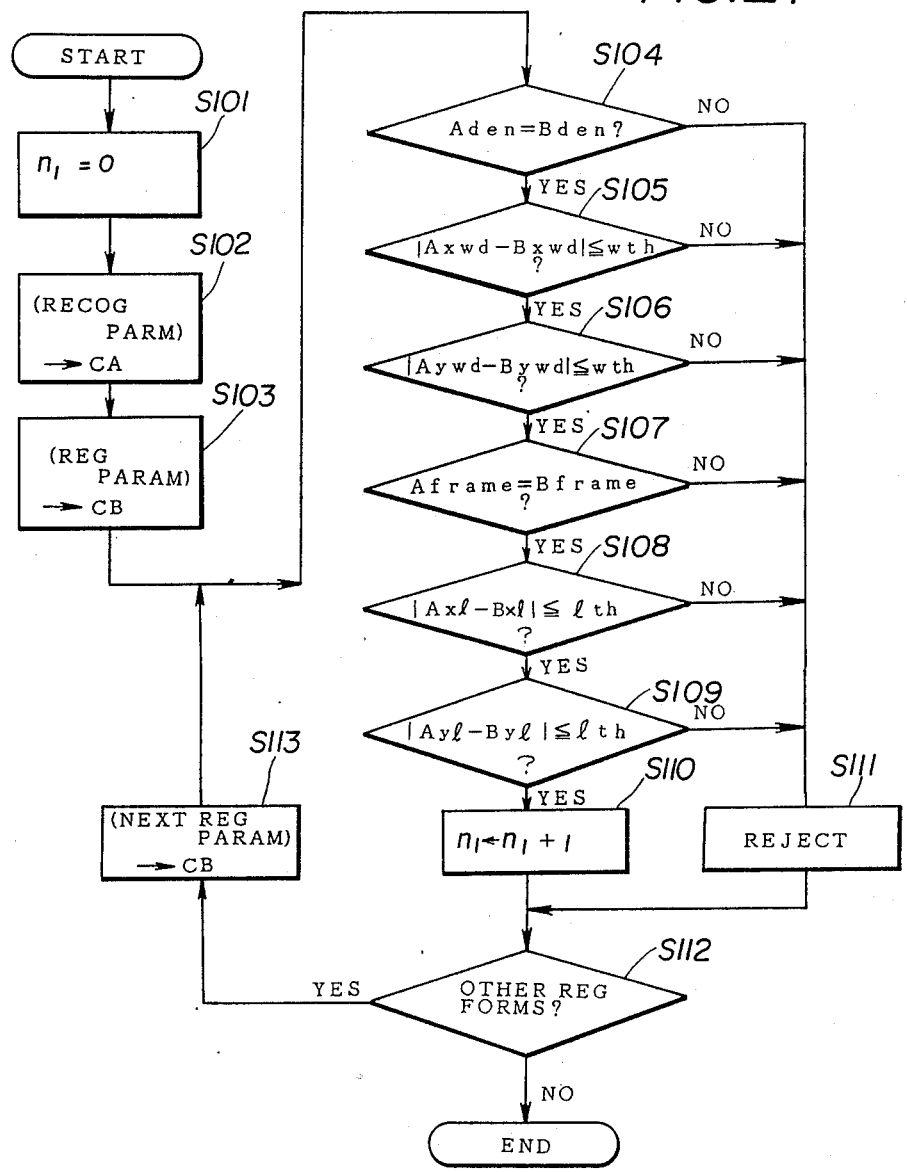
FIG. 21 is a flow chart showing an embodiment of the parameter evaluation process of the main processing unit.

An embodiment of the parameter evaluation is shown in FIG. 21. In this case, a step S101 resets a counter to "0", that is, $n_1=0$. A step S102 sets the discriminating parameters of the present recognized form of the form sheet into a comparison form CA. A step S103 sets the discriminating parameters of the first registered form of the form sheet into a comparison form CB. Steps S104 through S109 compare the discriminating parameters in the comparison form CA with the corresponding discriminating parameters of the comparison form CB. A step S110 increments the count in the counter when the discrimination result is YES in all of the steps S104 through S109. A step S111 rejects the comparison form CB when the discrimination result is NO in any of the steps S104 through S109.

Out of the steps S104 through S109, the step S104 discriminates whether or not a reading density Aden of the comparison form CA is equal to a reading density Bden of the comparison form CB. The step S105 discriminates whether or not a difference $|Axwd-Bxwd|$ in the widths along the x-direction of the comparison forms CA and CB is less than or equal to a threshold value Wth for the difference in the widths. Similarly, the step S106 discriminates whether or not a difference $|Aywd-Bywd|$ in the widths along the y-direction of the comparison forms CA and CB is less than or equal to the threshold value Wth. The step S107 discriminates whether or not a number of frames Aframe of the comparison form CA is equal to a number of frames Bframe of the comparison form CB. The step S108 discriminates whether or not a difference $|Axl-Bxl|$ in the number of line segments along the x-direction of the comparison forms CA and CB is less than or equal to a threshold value lth for the difference in the number of line segments. Similarly, the step S109 discriminates whether or not a difference $|Ayl-Byl|$ in the number of line segments along the y-direction of the comparison forms CA and CB is less than or equal to the threshold value lth.

A step S112 discriminates whether or not other registered forms for the form sheet exist, and the operation advances to a step S113 when the discrimination result in the step S112 is YES. The step S113 sets the discriminating parameters of the next registered form of the form sheet into the comparison form CB, and the operation advances to the step S104.

Figure 20:
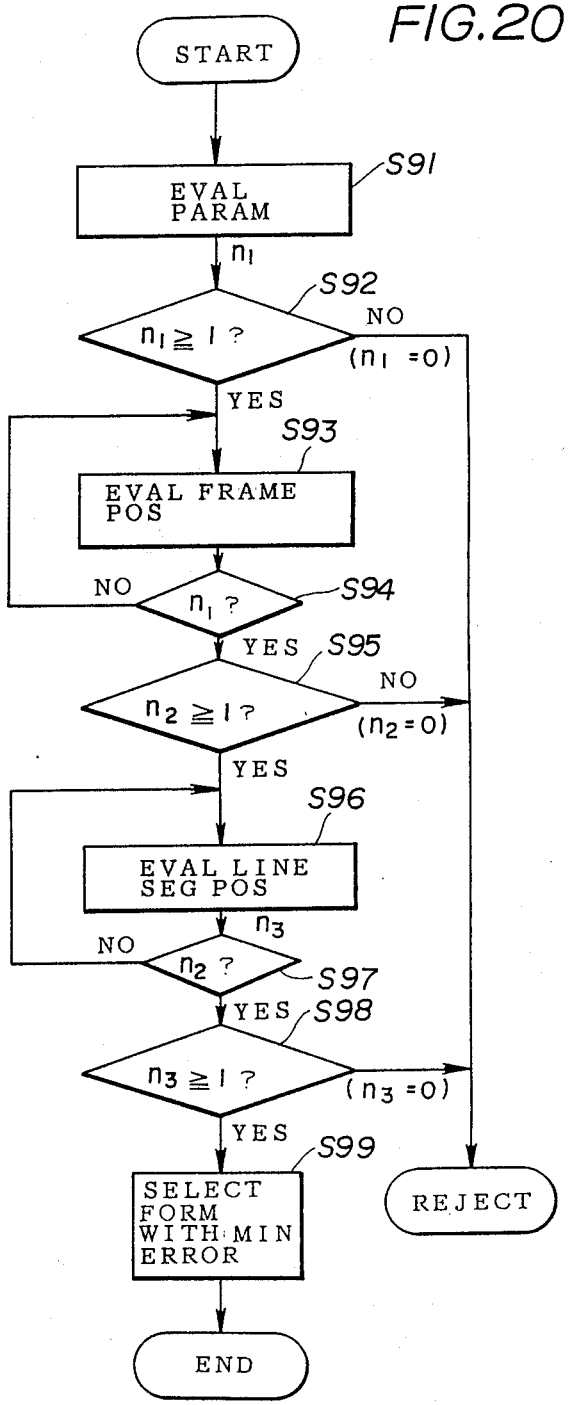
FIG. 20 is a flow chart showing an embodiment of the form discriminating process of the main processing unit.

Returning now to the description of FIG. 20, a step S92 discriminates whether or not $n_1 \geq 1$, that is, whether or not there is at least one form selected by the parameter evaluation described before. The selected forms are rejected when the discrimination result in the step S92 is NO.

The evaluation on the frame position is carried out in a step S93 when the discrimination result in the step S92 is YES. In other words, each frame position normalized with reference to the reference position Po shown in FIG. 15 is successively compared with the frame position of each registered form which has passed the parameter evaluation, by use of the start position $(ax_s, ay_s)$ and widths $(ax_e - ax_s)$ and $(ay_e - ay_s)$ of each normalized frame position. Those frame positions having errors totalling to a value within a predetermined range are selected.

The evaluation of the frame position is carried out for $n_1$ registered forms, and the number of selected forms is set to $n_2$. In other words, a step S94 discriminates whether or not the evaluation of the frame position is carried out for $n_1$ registered forms, and the operation is returned to the step S93 when the discrimination result in the step S94 is NO. On the other hand, when the discrimination result in the step S94 is YES, a step S95 discriminates whether or not $n_2 \geq 1$, that is, whether or not there is at least one selected form. The selected forms are rejected when the discrimination result in the step S95 is NO.

The evaluation of the line segment position is carried out in a step S96 when the discrimination result in the step S95 is YES. In other words, each line segment position normalized with reference to the reference position Po is successively compared with the line segment position of each of $n_2$ registered forms, by use of the start position $(x_s, y_s)$ and lengths $(x_e - x_s)$ and $(y_e - y_s)$ of each normalized line segment position. Those line segment positions having errors totalling to a value within a predetermined range are selected.

The evaluation of the line segment position is carried out for $n_2$ registered forms, and the number of selected forms is set to $n_3$. In other words, a step S97 discriminates whether or not the evaluation of the line segment position is carried out for $n_2$ registered forms, and the operation is returned to the step S96 when the discrimination result in the step S97 is NO. On the other hand, when the discrimination result in the step S97 is YES, a step S98 discriminates whether or not $n_3 \geq 1$, that is, whether or not there is at least one selected form. The selected forms are rejected when the discrimination result in the step S98 is NO.

On the other hand, when the discrimination result in the step S98 is YES, a step S99 selects a form having the smallest errors out of the selected forms. Normally, $n_3 = 1$, and the one registered form is naturally selected.

According to the present embodiment, the designation of the reading areas from which the entered characters and the like are to be read is extremely easy to carry out, where the reading areas are in the form sheet such as a slip or ticket having a predetermined fixed form defined by the frame line. In addition, by registering the forms beforehand, it is possible to continuously read data from a plurality of kinds of form sheets having different frame lines in an arbitrary sequence independent of the frame lines in the case where an automatic paper feeder is provided in the image scanner.

Moreover, since the frame line is recognized to produce the discriminating parameters of the form, the undesirable effect of noise is considerably reduced compared to the case where only the line segment is recognized. This noise includes a row of characters or the like which may be erroneously detected as a line segment. As a result, the discrimination accuracy is considerably improved over the conventional data reading apparatus.

In other words, according to the present invention, it is possible to quickly read data from selected areas of the form sheets, and the entry of the data from the form sheets can be made within a short period of time. It is unnecessary to manually designate the kind of form sheet that is scanned, because the kind of form sheet is automatically recognized from the form information of the form sheet, provided that the form information on the form sheet is registered beforehand.

Further, the present invention is not limited to these embodiments, but various variations and modifications may be made without departing from the scope of the present invention.

What is claimed is:

1. A data reading apparatus for reading data from a form sheet, said form sheet having a fixed form with spaces which are to be entered with the data, at least one of said spaces being surrounded by a frame line, said data reading apparatus comprising:

scanning means for optically scanning the form sheet and for outputting image data read from the form sheet;

storing means for storing form informations on different kinds of model form sheets having different fixed forms;

frame line recognition means for recognizing one or a plurality of frame lines from the image data outputted by said scanning means;

discriminating means for discriminating the kind of the form sheet which is scanned by said scanning means by comparing a form information related to at least one frame line which is recognized by said frame line recognition means with the form informations stored in said storing means; and reading means for reading from the image data outputted from said scanning means data in predetermined reading areas of the form sheet depending on the form information of a model form sheet which is discriminated in said discriminating means as being identical to the kind of form sheet scanned by said scanning means.

2. A data reading apparatus as claimed in claim 1 in which said storing means stores as the form informations at least first data related to one or a plurality of predetermined reading areas in each of the model form sheets from which data are to be read and second data related to reading conditions under which the data are to be read from the one or plurality of predetermined reading areas in each of the model form sheets.

3. A data reading apparatus as claimed in claim 2 in which said second data related to the reading conditions include at least one of type, hand-written and image modes in which the data on the form sheet are to be read as being entered in type, hand-writing and image, respectively.

4. A data reading apparatus for reading data from a form sheet, said form sheet having a fixed form with spaces which are to be entered with the data, said data reading apparatus comprising:

scanning means for optically scanning the form sheet and for outputting image data read from the form sheet;

storing means for storing form informations on different kinds of model form sheets having different fixed forms;

discriminating means for discriminating the kind of the form sheet which is scanned by said scanning means by comparing a form information on the form sheet included in the image data from said scanning means with the form informations stored in said storing means; and reading means for reading from the image data outputted from said scanning means data in predetermined reading areas of the form sheet depending on the form information of a model form sheet which is discriminated in said discriminating means as being identical to the kind of form sheet scanned by said scanning means, said storing means storing as the form informations at least first data related to one or a plurality of predetermined reading areas in each of the model form sheets from which data are to be read and second data related to reading conditions under which the data are to be read from the one or plurality of predetermined reading areas in each of the model form sheets, said second data related to the reading conditions including at least a reading mode with which the data on each of the model form sheets are to be read.

5. A data reading apparatus for reading data from a form sheet, said form sheet having a fixed form with spaces which are to be entered with the data, said data reading apparatus comprising:

scanning means for optically scanning the form sheet and for outputting image data read from the form sheet;

storing means for storing form informations on different kinds of model form sheets having different fixed forms;

discriminating means for discriminating the kind of the form sheet which is scanned by said scanning means by comparing a form information on the form sheet included in the image data from said scanning means with the form informations stored in said storing means; and reading means for reading from the image data outputted from said scanning means data in predetermined reading areas of the form sheet depending on the form information of a model form sheet which is discriminated in said discriminating means as being identical to the kind of form sheet scanned by said scanning means, said storing means storing as the form informations at least first data related to one or a plurality of predetermined reading areas in each of the model form sheets from which data are to be read and second data related to reading conditions under which the data are to be read from the one or plurality of predetermined reading areas in each of the model form sheets, said second data related to the reading conditions including at least one of reading density and reading tone with which the data on each of the model form sheets are to be read.

6. A data reading apparatus as claimed in claim 1 which further comprises pre-registering means for registering the form informations on the model form sheets into said storing means by scanning the model form sheets by said scanning means and using the frame lines recognized by said frame line recognition means.

7. A data reading apparatus for reading data from a form sheet, said form sheet having a fixed form with spaces which are to be entered with the data, said data reading apparatus comprising:

scanning means for optically scanning the form sheet and for outputting image data read from the form sheet;

storing means for storing form informations on different kinds of model form sheets having different fixed forms;

discriminating means for discriminating the kind of the form sheet which is scanned by said scanning means by comparing a form information on the form sheet included in the image data from said scanning means with the form informations stored in said storing means;

reading means for reading from the image data outputted from said scanning means data in predetermined reading areas of the form sheet depending on the form information of a model form sheet which is discriminated in said discriminating means as being identical to the kind of form sheet scanned by said scanning means; and pre-registering means for registering the form information on the model form sheets into said storing means by scanning the model form sheets by said scanning means, said pre-registering means comprising recognition means for recognizing a fixed form of a model form sheet from the image data outputted from said scanning means, memory means for temporarily storing the recognized fixed form recognized in said recognition means, reading area designating means for designating one or a plurality of reading areas on the model form sheet from which data are to be read, reading condition designating means for designating one or a plurality of reading conditions under which the data are to be read from each of the one or plurality of reading areas on the model form sheet, and form information registering means for registering the form information of the model form sheet by storing into said storing means the recognized fixed form from said memory means, the designated reading areas from said reading area designating means and the reading conditions from said reading condition designating means.

8. A data reading apparatus as claimed in claim 7 in which said recognition means recognizes a frame line as the fixed form, said frame line surrounding a rectangular area by four line segments.

9. A data reading apparatus as claimed in claim 7 in which said reading area designating means and said reading condition designating means are constituted by a keyboard.

10. A data reading apparatus as claimed in claim 9 which further comprises a display device for displaying the image data read from the model form sheet by said scanning means, said display device in combination with said keyboard constituting said reading area designating means and said reading condition designating means.

11. A data reading apparatus for reading data from a form sheet, said form sheet having a fixed form with spaces which are to be entered with the data, said data reading apparatus comprising:

scanning means for optically scanning the form sheet and for outputting image data read from the form sheet;

storing means for storing form informations on different kinds of model form sheets having different fixed forms;

discriminating means for discriminating the kind of the form sheet which is scanned by said scanning means by comparing a form information on the form sheet included in the image data from said scanning means with the form informations stored in said storing means;

reading means for reading from the image data outputted from said scanning means data in predetermined reading areas of the form sheet depending on the form information of a model form sheet which is discriminated in said discriminating means as being identical to the kind of form sheet scanned by said scanning means; and pre-registering means for registering the form information on the model form sheets into said storing means by scanning the model form sheets by said scanning means, said pre-registering means registering the form informations on the model form sheets into said storing means by scanning the model form sheets by said scanning means at a first reading density, said scanning means scanning the form sheet from which the data are to be read at a second reading density, said first reading density being smaller than said second reading density.

12. A data reading apparatus as claimed in claim 1 in which said discriminating means comprises first memory means for temporarily storing the image data from said scanning means, form recognition means for recognizing the fixed form of the form sheet from the frame lines recognized by said frame line recognition means, second memory means for temporarily storing a form information on the recognized fixed form recognized in said form recognition means, form discriminating means for discriminating the fixed form of the form sheet by comparing a fixed form information within the form information stored in said second memory means with fixed form informations within the form informations stored in said storing means and for outputting reading area information related to one or plurality of reading areas on the form sheet from which the data are to be read, and extracting means for extracting data within the one or plurality of reading areas from the image data stored in said first memory means based on the reading area information, said reading means reading the extracted data depending on the form information from said storing means.

13. A data reading apparatus as claimed in claim 12 in which said form recognition means recognizes a frame line as the fixed form, said frame line surrounding a rectangular area by four line segments.

14. A data reading apparatus as claimed in claim 1 in which said image scanner successively scans a plurality of form sheets.

15. A data reading apparatus as claimed in claim 14 in which said plurality of form sheets are made up of form sheets having at least two different fixed forms, said image scanner successively scanning said plurality of form sheets in an arbitrary sequence independent of the fixed forms of the form sheets.

* * * * *